(No Model.) 2 Sheets—Sheet 1.
W. B. MILLER.
FARM GATE.
No. 247,093. Patented Sept. 13, 1881.
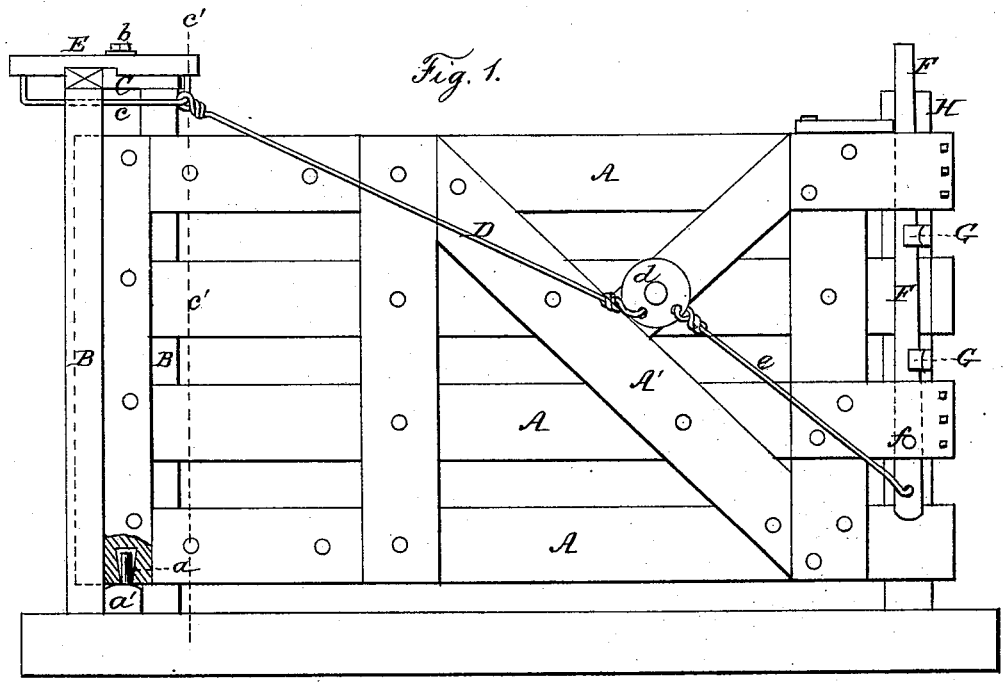
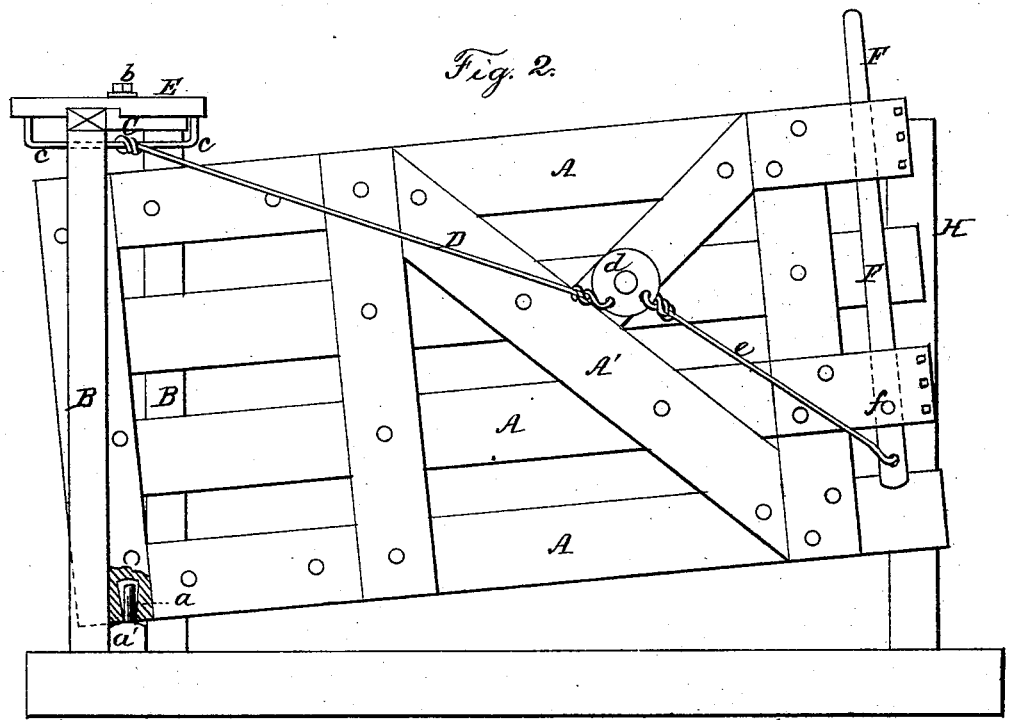
Witnesses:
Edmond Bodlag
Philip F. Larnet
Inventor:
Wilson B. Miller,
by Johnson and Johnson
Attys.
N. PETERS, Photo-Lithographer, Washington, D. C.

(No Model.) 2 Sheets—Sheet 2.
W. B. MILLER.
FARM GATE.
No. 247,093. Patented Sept. 13, 1881.
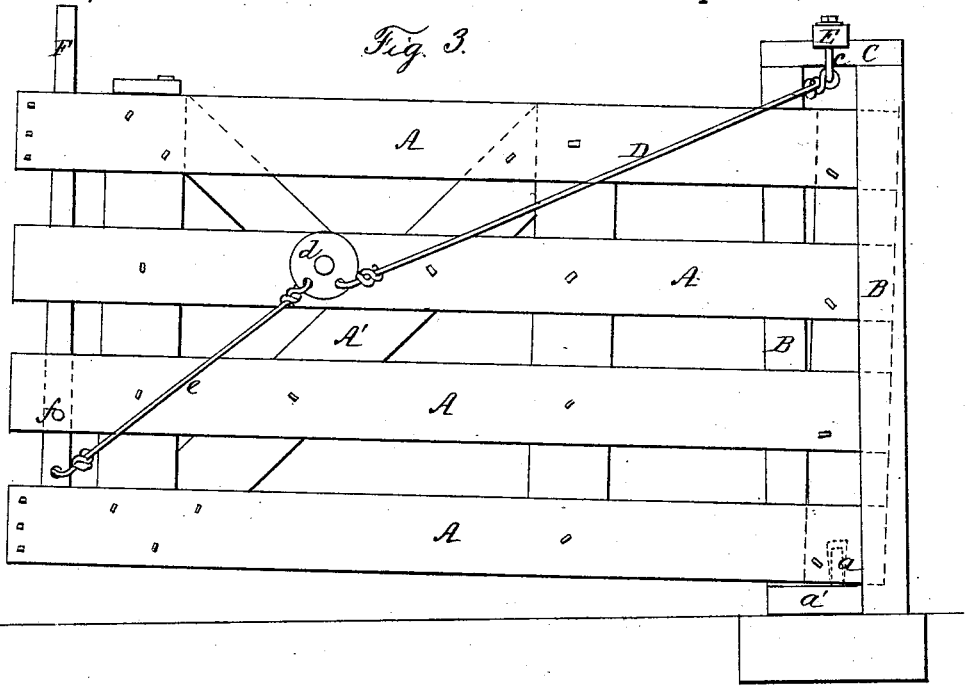
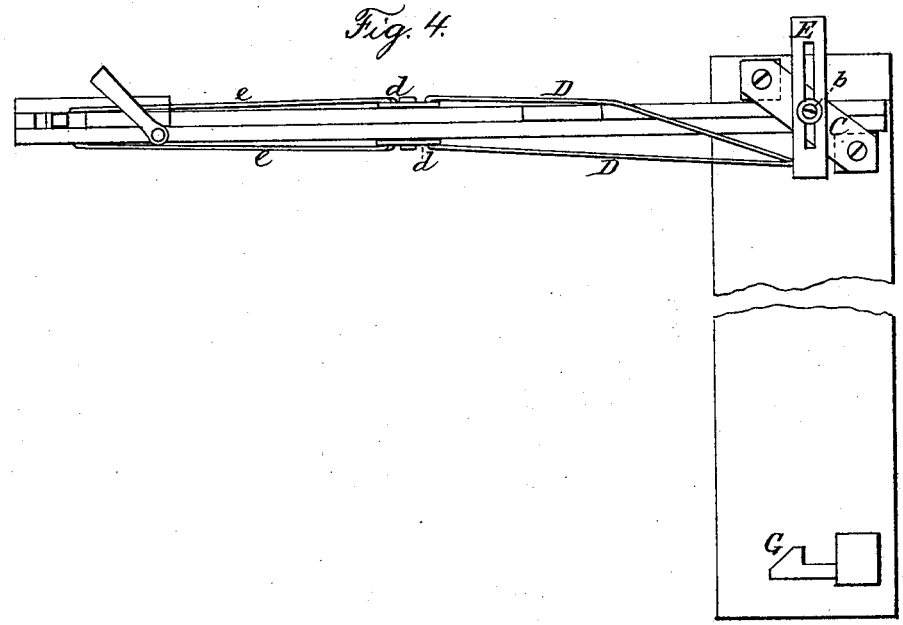
Witnesses:
Edmond Brodhag
Philip F. Larner
Inventor:
Wilson B. Miller
by Johnson and Johnson
Attys

UNITED STATES PATENT OFFICE.

WILSON B. MILLER, OF SHERMAN, TEXAS.

FARM-GATE.

SPECIFICATION forming part of Letters Patent No. 247,093, dated September 13, 1881.

Application filed August 4, 1881. (No model.)

*To all whom it may concern:*

Be it known that I, WILSON B. MILLER, a citizen of the United States, residing at Sherman, in the county of Grayson and State of Texas, have invented new and useful Improvements in Farm-Gates, of which the following is a specification.

The hinged end of the gate is mounted upon a bottom pivot-pin, and its swing or latch end is suspended by diagonal wires from the tops of the supporting-posts. In such a suspended swinging gate I have made provision for effecting three objects or things—viz., to take up the sag of the gate, to cause the gate to be automatically closed when opened, and to allow the gate to be raised at its free end in opening it over snow. These things are effected by a slotted bar secured to the tops of the supporting-posts, having a depending staple or loop, and adjustable in the line of the gate when closed, the said staple-connection with the suspending-wire being at a point vertically between the gate-pivot and its swing end, so as to have a foreshortening action in opening the gate, and thereby cause its free end to be raised and to exert a lateral pulling action upon the gate to automatically close it. The suspending-wires are attached to the forward part of the gate by pivoted plates, one on each side of the gate, in such manner that the weight of the gate tends constantly to turn said plates upon their pivots, and to these plates shorter wires are connected, and to the latch, in such manner that the pull of the suspension-wires upon the plates causes the latter to exert an indirect pulling action upon the latch-wires, and thus automatically latch the gate when closed. This construction renders the use of the suspension-wires both convenient and durable, while the slotted bar and staple device gives important advantages in the use of such suspension-wires.

Referring to the accompanying drawings, Figure 1 represents an elevation of a gate embracing my invention; Fig. 2, an elevation of the gate in raised position to open it over snow; Fig. 3, an elevation of the gate in open position, and Fig. 4 a top view of the gate in open position.

The gate-bars A are rigidly connected together and strengthened and braced by the diagonal bar A', secured to the bars A between the outer and vertical inner bars, so as to stand in the direction of the suspension-wires, and thus prevent the weight of the gate upon the diagonal wires from drawing the bars upward and the gate out of shape. The relation of the diagonal brace, therefore, to the suspension-wires is important in a gate suspended diagonally from its free end to counteract the diagonal strain due to the weight of the gate and to maintain the proper relation of the latch with the latch-post.

The gate is mounted and swings upon a bottom pivot-pin, $a$, between posts B B, placed diagonally to each other in relation to the line of the gate when closed, and between which the pivoted end of the gate is supported. The pivot-pin is secured vertically in a cross-sill, $a'$, centrally between the posts which support the gate in being opened and closed; but said pin may be secured horizontally between the posts. These posts are connected at the top by a cross-bar, C, and they are firmly planted in the ground. The latch end of the gate is suspended by a wire, B, connected to the gate and to the posts in a manner which I will now describe. A slotted bar, E, is secured to the cross-bar C by a screw, $b$, or otherwise, so as to allow said slotted bar to be adjusted toward and from the latch-post in the line of the gate when closed. A strong metal rod, $c$, is firmly secured to and depends from the slotted bar beneath the cross-bar, and forms a long horizontal staple or loop, to which the suspension-wire D is held at a point above the gate and between its latch end and the pivot-pin, as shown by the dotted line $c'$ in Fig. 1. The object of thus connecting the suspension-wire is to cause it to have a foreshortening action upon the gate in being opened, and thereby cause it to close automatically by reason of exerting a lateral pull and lifting action upon latch end of the gate, while such connection also allows the wire to slide back over the staple in elevating the swing end of the gate to open it over snow, as shown in Fig. 2.

The capacity for adjustment of the slotted bar is to take up the sag, as may be required from time to time, and which may be produced by the weight of the gate and by the yielding of its supporting-posts. In taking up such sag it is only necessary to unfasten the slotted bar and set it back from the latch end of the gate, which is thereby raised by the suspending-wires, so as to keep it free of the ground when the bar is again secured to the posts. As the gate is suspended by the wire pulling against the end of the loop c, the wire is free to slide upon said loop in raising the swing end of the gate upon its pivoted end to open it over snow.

The suspending-wire is made double, so as to pass over each side of the gate, to which its ends are connected by plates d d, secured by a strong pin on each side of the gate, the said pin preferably passing through a diagonal bar at the forward and upper part of the gate. The connection of the wire with the pivoted plates is such as to constantly exert an upward pulling force to turn them upon their pivots.

The latch F is pivoted near its lower end and fastens with catches G in the post H. A wire or wires, e, connect with the latch below its pivot f, and with the pivot plate or plates, in such manner that the pulling force of the suspension-wire will tend to turn the plates so as to pull upon the latch-wire, and thus automatically latch the gate when closed. The pivoted plates thus serve to relieve the latch of a part of the weight of the gate, as they form indirect means for connecting the suspension-wires with the latch, and the pulling force upon the latter is not so great as if the suspension-wires were connected directly to the latch, thus giving the advantage of relieving the latch-pivot of the direct pull of the suspension-wires.

The extent to which the latch end of the gate is raised in being opened is governed by the distance of the point of suspension above the gate, and this may give an important advantage in the use of a gate adapted to open uphill.

Referring to the indirect pull of the suspension-wires upon the latch-connecting wires, it will be noticed that such result is obtained by connecting the latch-wire with the pivoted plates at a point out of direct line with the suspension-wires, and thus the pulling force exerted upon the latch is less than the pulling force of the suspension-wires upon the pivoted plates.

I claim—

1. In a swinging gate pivoted at its lower inner end and suspended by a diagonal wire, upon which it swings in being opened and closed, the adjustable bar E, provided with a depending loop or staple, c, for the suspending-wire, the point of suspension by said loop being between the latch end of the gate and a vertical line drawn through its pivot-pin, substantially as described, for the purpose specified.

2. The combination, in a swinging gate, of the suspending-wires and the adjustable bar E with the pivoted plates d, the latch F, and the wire or wires e, connecting said pivoted plates with the latch out of direct line with the suspension-wires, substantially as described, for the purpose specified.

In testimony whereof I have hereunto set my hand in the presence of two subscribing witnesses.

WILSON B. MILLER.

Witnesses:
WILLIAM W. WHITE,
P. W. BROWN.